US009695760B2

(12) United States Patent
Dufford et al.

(10) Patent No.: US 9,695,760 B2
(45) Date of Patent: Jul. 4, 2017

(54) SYSTEM AND METHOD FOR IMPROVING ENERGY EFFICIENCY OF A VEHICLE BASED ON KNOWN ROUTE SEGMENTS

(71) Applicant: Toyota Motor Engineering & Manufacturing North America, Inc., Erlanger, KY (US)

(72) Inventors: Mohammad E. Dufford, Los Angeles, CA (US); Joshua D. Payne, Irvine, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 340 days.

(21) Appl. No.: 14/230,557

(22) Filed: Mar. 31, 2014

(65) Prior Publication Data

US 2015/0275787 A1     Oct. 1, 2015

(51) Int. Cl.
*F02D 29/02*     (2006.01)
*B60W 30/18*     (2012.01)
*F02N 11/08*     (2006.01)

(52) U.S. Cl.
CPC ....... *F02D 29/02* (2013.01); *B60W 30/18009* (2013.01); *F02N 11/0837* (2013.01);
(Continued)

(58) Field of Classification Search
CPC ............... F02D 29/02; F02D 2200/501; F02D 2200/602; F02D 2200/701;
(Continued)

(56) References Cited

U.S. PATENT DOCUMENTS 6,076,964 A   6/2000 Wu et al.
6,118,237 A   9/2000 Kikuchi et al.
(Continued)

FOREIGN PATENT DOCUMENTS

DE    10035027    7/2000
DE    10233376    2/2004
(Continued)

OTHER PUBLICATIONS

US 8,447,504, 05/2013, Konishi et al. (withdrawn)

*Primary Examiner* — Thomas Moulis
*Assistant Examiner* — Susan Scharpf
(74) *Attorney, Agent, or Firm* — Snell & Wilmer LLP (57) ABSTRACT

A method/system for maintaining the energy efficiency history of predicted route segments in a database, providing adaptive feedback to hybrid vehicle controls, and displaying the energy efficiency history to the driver. As the vehicle travels on a route, the system stores energy efficiency information for route segments. The system may include sensors, a memory, and a processor to learn energy efficiency information based on how fuel and battery power are used over a route segment and/or route. The method/system may utilize energy efficiency information to adjust a start/stop engine threshold of a hybrid vehicle. When the processor predicts that the vehicle will travels on the predicted route segment again, the vehicle may optimize powertrain parameters such as the start/stop engine threshold during traveling on the predicted route segment and/or before reaching the predicted route segment.

15 Claims, 3 Drawing Sheets

(52) U.S. Cl.
CPC .............. *F02D 2200/0625* (2013.01); *F02D 2200/501* (2013.01); *F02D 2200/602* (2013.01); *F02D 2200/701* (2013.01); *F02N 2200/123* (2013.01); *F02N 2300/2006* (2013.01); *Y02T 10/48* (2013.01)

(58) Field of Classification Search
CPC ..... F02D 2009/0245; F02D 2009/0247; F02D 2041/0095; F02D 41/042; B60W 30/18009; F02N 11/0837; F02N 2200/123; F02N 2300/2006; F02N 11/08; F02N 11/00; F02N 11/0814; F02N 11/0818; F02N 11/0825; F02N 11/0829; F02N 11/0833; F02N 11/084; F02N 11/0844; F02N 2300/00; F02N 2300/20; F02N 2300/304
USPC ........................................ 701/102; 123/179.4
See application file for complete search history.

(56) References Cited

U.S. PATENT DOCUMENTS

| | | | |
|---|---|---|---|
| 6,233,517 B1 | 5/2001 | Froeberg | |
| 6,314,347 B1 | 11/2001 | Kuroda et al. | |
| 6,688,122 B2 | 2/2004 | Matsuoka | |
| 6,941,222 B2 | 9/2005 | Yano et al. | |
| 7,058,506 B2 | 6/2006 | Kawase et al. | |
| 7,154,068 B2 | 12/2006 | Zhu et al. | |
| 7,199,559 B2 | 4/2007 | Yanagi | |
| 7,221,287 B2 | 5/2007 | Gueziec et al. | |
| 7,233,861 B2 | 6/2007 | Van Buer et al. | |
| 7,360,615 B2 | 4/2008 | Salman et al. | |
| 7,395,149 B2 | 7/2008 | Matsumoto et al. | |
| 7,610,145 B2 | 10/2009 | Kantarjiev et al. | |
| 7,657,373 B2 | 2/2010 | Kindo | |
| 7,778,769 B2 | 8/2010 | Boss et al. | |
| 7,783,396 B2 | 8/2010 | Arita et al. | |
| 7,788,027 B2 | 8/2010 | Jones | |
| 7,877,198 B2 | 1/2011 | Tenzer et al. | |
| 7,880,597 B2 | 2/2011 | Uchida | |
| 7,999,505 B2 | 8/2011 | Bertness | |
| 7,999,664 B2 | 8/2011 | Barajas | |
| 8,063,609 B2 | 11/2011 | Salasoo et al. | |
| 8,068,977 B2 | 11/2011 | Ozawa et al. | |
| 8,073,615 B2 | 12/2011 | Kudoh et al. | |
| 8,165,791 B2 | 4/2012 | Yamada et al. | |
| 8,175,802 B2 | 5/2012 | Forstall et al. | |
| 8,204,640 B2 | 6/2012 | Tani et al. | |
| 8,258,726 B2 | 9/2012 | Okuda et al. | |
| 8,290,637 B2 | 10/2012 | Krupadanam et al. | |
| 8,336,651 B2 | 12/2012 | Nishi et al. | |
| 8,346,420 B2 | 1/2013 | Tarnowsky et al. | |
| 8,370,012 B2 | 2/2013 | Yamada et al. | |
| 8,392,116 B2 | 3/2013 | Lehmann et al. | |
| 8,428,804 B2 * | 4/2013 | Sakai | B60L 1/00 180/65.28 |
| 8,457,874 B2 | 6/2013 | Kancharla et al. | |
| 8,478,642 B2 | 7/2013 | Dey et al. | |
| 8,498,809 B2 | 7/2013 | Bill | |
| 8,509,987 B2 | 8/2013 | Resner | |
| 8,515,607 B2 | 8/2013 | Amano et al. | |
| 8,532,920 B2 | 9/2013 | Coleman et al. | |
| 8,548,660 B2 | 10/2013 | Thai-Tan et al. | |
| 8,576,057 B2 | 11/2013 | Sekiyama et al. | |
| 8,594,912 B2 * | 11/2013 | Weaver | F02D 41/123 123/179.4 |
| 2004/0230376 A1 | 11/2004 | Ichikawa et al. | |
| 2008/0012535 A1 | 1/2008 | Takatsuji et al. | |
| 2008/0027639 A1 | 1/2008 | Tryon | |
| 2008/0252484 A1 | 10/2008 | Hopkins | |
| 2009/0082967 A1 | 3/2009 | Hara et al. | |
| 2009/0138190 A1 | 5/2009 | Kulik et al. | |
| 2009/0293522 A1 | 12/2009 | Miyazaki | |
| 2010/0090818 A1 | 4/2010 | Sekiyama et al. | |
| 2010/0280687 A1 * | 11/2010 | Tate, Jr. | B60W 10/06 701/22 |
| 2011/0127958 A1 | 6/2011 | Ishishita et al. | |
| 2011/0153127 A1 * | 6/2011 | Weslati | B60W 50/085 701/22 |
| 2011/0161001 A1 | 6/2011 | Fink | |
| 2011/0166773 A1 | 7/2011 | Raz et al. | |
| 2011/0231354 A1 | 9/2011 | O'Sullivan et al. | |
| 2011/0246010 A1 | 10/2011 | de la Torre Bueno | |
| 2012/0032637 A1 | 2/2012 | Kotooka et al. | |
| 2012/0035843 A1 | 2/2012 | Miura et al. | |
| 2012/0095670 A1 * | 4/2012 | Piggott | F02D 17/04 701/112 |
| 2012/0136553 A1 * | 5/2012 | Takeuchi | F02N 11/0814 701/102 |
| 2012/0158228 A1 | 6/2012 | Biondo et al. | |
| 2012/0173245 A1 | 7/2012 | Miyahara et al. | |
| 2012/0200257 A1 | 8/2012 | Schwarz et al. | |
| 2012/0290149 A1 | 11/2012 | Kristinsson et al. | |
| 2012/0316712 A1 | 12/2012 | Simonini et al. | |
| 2013/0013183 A1 | 1/2013 | Surnilla et al. | |
| 2013/0024060 A1 | 1/2013 | Sukkarie et al. | |
| 2013/0030694 A1 | 1/2013 | Nortrup | |
| 2013/0131892 A1 | 5/2013 | Hashimoto et al. | |
| 2013/0198031 A1 | 8/2013 | Mitchell et al. | |
| 2013/0229153 A1 | 9/2013 | Sarkar et al. | |
| 2013/0261914 A1 | 10/2013 | Ingram et al. | |
| 2013/0274952 A1 | 10/2013 | Weslati et al. | |
| 2013/0296126 A1 * | 11/2013 | Gibson | F02N 11/006 477/5 |
| 2013/0345952 A1 * | 12/2013 | Tsumori | F02D 29/02 701/113 |
| 2015/0275787 A1 * | 10/2015 | Dufford | F02D 29/02 701/102 |

FOREIGN PATENT DOCUMENTS

| | | |
|---|---|---|
| DE | 102005005002 | 8/2006 |
| EP | 2355018 | 8/2011 |
| GB | 2499712 | 8/2013 |
| JP | 2006-139963 | 6/2006 |
| JP | 2010-226880 | 10/2010 |
| JP | 2012-210004 | 10/2012 |
| JP | 2004-324613 | 11/2013 |
| WO | WO 2010/000239 | 7/2010 |
| WO | WO 2011/134992 | 11/2011 |
| WO | WO 2013/134863 | 9/2013 |

* cited by examiner

SYSTEM AND METHOD FOR IMPROVING ENERGY EFFICIENCY OF A VEHICLE BASED ON KNOWN ROUTE SEGMENTS

BACKGROUND

1. Field

The present invention relates to methods and systems of route prediction and improvement of energy efficiency for a vehicle.

2. Description of the Related Art

With global energy prices rapidly increasing, users of vehicles that utilize various forms of energy are increasingly interested in enhancing the overall energy efficiency of their vehicle. The overall energy efficiency accounts for consumption of various forms of energy that may include fuel energy, electrical energy, and/or various forms of regenerated energy. There is a need in the art for a method and a system of actively and dynamically adjusting vehicle operations to improve the overall energy efficiency of a vehicle.

SUMMARY

In an embodiment, a method and a system are provided for maintaining the energy efficiency history of predicted route segments in a database, providing adaptive feedback to hybrid vehicle controls, and displaying the energy efficiency history to the driver. As the vehicle travels on a route, the system stores energy efficiency information for route segments. The system may include sensors, a memory, and a processor to learn energy efficiency information based on how fuel and battery power are used over a route segment and/or a route. The method and/or the system may utilize energy efficiency information to adjust a start/stop engine threshold of a hybrid vehicle. For example, when the processor predicts that the vehicle will travel on the predicted route segment again, the vehicle may optimize powertrain parameters such as the start/stop engine threshold during traveling on the predicted route segment and/or before reaching the predicted route segment.

In an embodiment, a method is provided for optimizing energy efficiency of a hybrid vehicle for known route segments or routes. The method may include: storing, in a memory, vehicle operation data for a known route segment or route; providing a processor connected to the memory and to an engine of the vehicle; predicting, using the processor, that the vehicle will travel over the known route segment or route; and adjusting, using the processor, an operation of the engine based on the stored vehicle operation data for optimizing the energy efficiency of the hybrid vehicle.

In an embodiment, a method is provided for optimizing energy efficiency of a hybrid vehicle for known route segments or routes. The method may include: storing, in a memory, a plurality of route segments and corresponding energy efficiency data; storing, in the memory, at least one of an engine start threshold for starting an operation of the engine or an engine stop threshold for stopping an operation of the engine; identifying, using a processor connected to the memory, at least one route segment of the plurality of route segments; and adjusting, using the processor, at least one of the engine start threshold or the engine stop threshold based on the corresponding energy efficiency data of the identified at least one route segment for improving the energy efficiency of the hybrid vehicle.

In an embodiment, a system is provided for optimizing energy efficiency of a hybrid vehicle for known route segments or routes. The system may include a memory for storing vehicle operation data for a known route segment or route. The system may also include a processor connected to the memory and to an engine of the vehicle, the processor configured to predict that the vehicle will travel over the known route segment or route, and adjust an operation of the engine based on the stored vehicle operation data for optimizing the energy efficiency of the hybrid vehicle.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
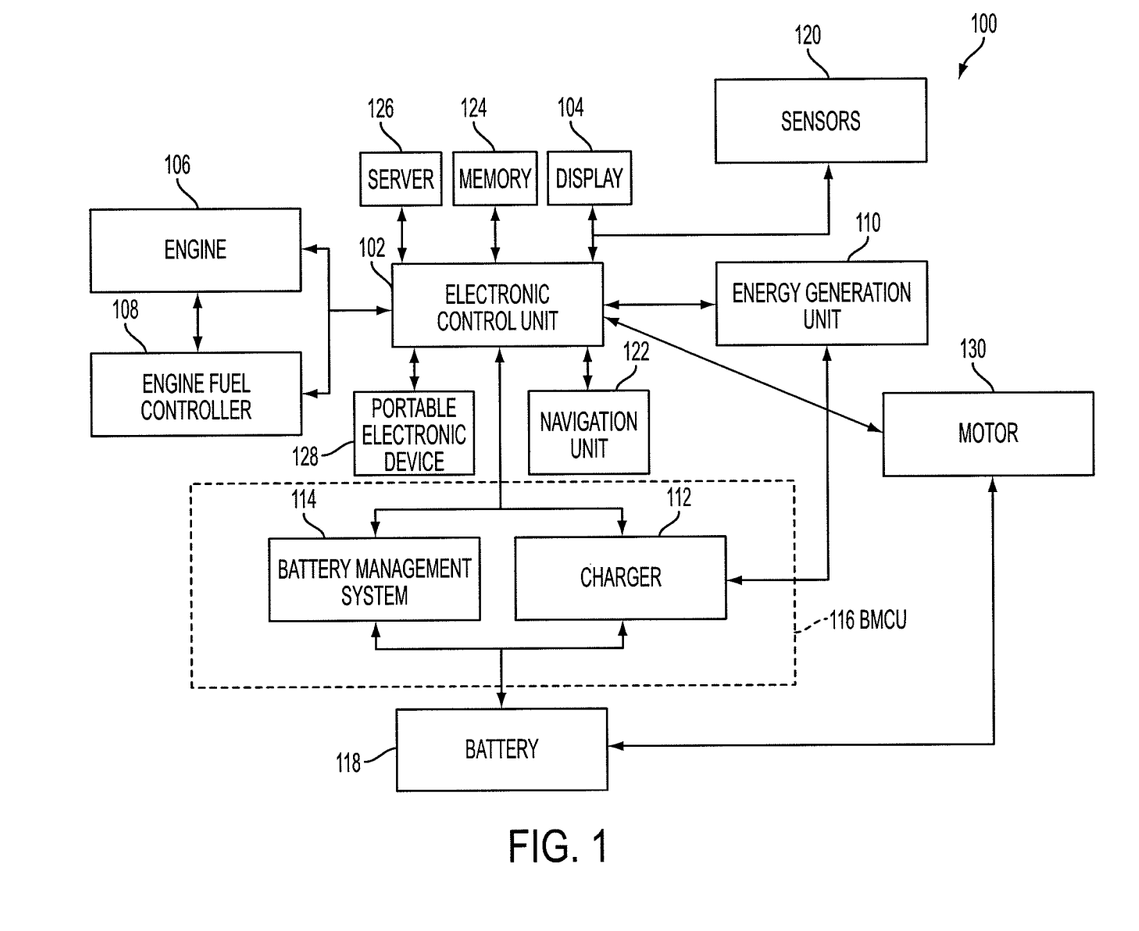
FIG. 1 is a block diagram of a vehicle that utilizes route prediction to improve energy efficiency of the vehicle according to an embodiment of the present invention.

Referring to FIG. 1, a block diagram is shown of a vehicle 100 according to an embodiment of the present invention. The vehicle 100 may include an electronic control unit (ECU) 102, a display 104, an engine 106, an engine fuel controller 108, an energy generation unit 110, a charger 112, a battery management and control unit (BMCU) 116, a battery 118 and sensors 120. The BMCU 116 may include a battery management system (BMS) 114 and a charger 112. The charger 112 may be configured to be coupled to an external charger.

The vehicle 100 operates by utilizing a fuel source and a non-fuel source for energy. The vehicle 100 may be an alternative fuel vehicle, a hybrid electric vehicle, a plug-in hybrid electric vehicle, an electric vehicle or a solar powered vehicle or any other vehicle utilizing a non-fuel source of energy without limiting the scope of the present invention.

The ECU 102 may be in continuous or periodic communication with the display 104, the engine 106, the engine fuel controller 108, the energy generation unit 110, the BMS 114, the charger 112, the navigation unit 122, the memory 124, the motor 130, and/or other units of the vehicle 100 using transmission of electronic signals through a Control Area Network (CAN) bus. In other embodiments, the control and communication may be over various other types of serial or parallel communication links, direct wirings, digital communication buses, wireless communications or other communication links.

The engine fuel controller 108 controls and monitors injection of fuel into the engine 106 for an internal combustion operation. The amount of fuel supplied to the engine 106 may be determined based in part on the pulse width of the fuel injector. The engine fuel controller 108 and/or the ECU 102 may determine a fuel consumption rate using a mass airflow sensor, an oxygen sensor, a throttle position sensor monitoring the throttle valve position, a coolant temperature sensor, an air pressure sensor, an engine speed sensor and/or other input and output sensors generating signals allowing the ECU 102 to determine the fuel consumption rate or amount. The ECU 102 may use a look-up table, an algorithm or data stored in the memory 124 to determine the fuel consumption amount or value. An engine starter may also be utilized to start an operation of the engine.

Various types of fuel may be used by the vehicle 100 including but not limited to gasoline, diesel, ethanol, biodiesel, natural gas, propane, hydrogen or combinations thereof. The vehicle 100 may also include a fuel cell in lieu of or in addition to the engine 106 which may charge the battery 118 and/or a capacitor by converting a fuel through a chemical reaction with an oxidizing agent. A fuel consumption sum amount may be calculated and communicated with the ECU 102 in order to determine the fuel consumption rate.

In addition to or alternatively, the vehicle 100 may utilize power provided by the battery 118 for driving the wheels of the vehicle 100. For example, the ECU 102 may control an operation of one or more motors 130. The motor 130 is powered using charge stored in the battery 118. The connection between the battery 118 and the motor 130 (and/or other connections shown in FIG. 1) may include inverters and/or converters as known in the art.

In an embodiment, one or motors 130 may be utilized. The motor 130 may be an electric motor for outputting additional torque and power to assist the engine 106 in driving the wheels and/or outputting torque and power to drive the wheels when the engine 106 is in an off state. The amount of output torque and/or output power supplied by the motor can depend on the amount of output torque and/or output power supplied by the engine 106. For example, more power is provided by the motor 130 to meet a given power demand of the driver when less power is provided by the engine 106. For example, the ECU 102 may control torque and/or power outputted by the motor 130 and may control torque or power outputted by the engine 106 by transmitting control commands from the ECU 102 to the motor 130 and/or the engine 106. The engine 106 and/or the motor 130 may be connected to a transmission with a controllable transmission input/output ratio for driving the wheels using the torque provided by the engine 106 and/or the motor 130. In certain embodiments, the engine 106 and/or the motor 130 may be connected to the transmission, for example, via a differential linkage, power splitting mechanisms and/or various other linkages known in the art.

The motor 130 may include one or more motor-generator. For example, under certain conditions, at least one of the motor-generators may use battery power to drive the wheels, and under certain conditions, at least one of the motor-generators may utilize regenerative braking and/or energy generated by the engine 106 to charge the battery 118.

The ECU 102 may be connected to sensors 120 for detecting various parameters regarding units and/or devices of the vehicle. The sensors 120 may include a vehicle speed sensor. To determine a fuel-equivalent distance-per-energy consumption rate, the ECU 102 may determine the distance travelled during a time period. In an embodiment, the ECU 102 may determine the vehicle speed during the time period using the vehicle speed sensor. The ECU 102 may then integrate the vehicle speed over the time period to determine the distance travelled by the vehicle 100 during the time period. Alternatively, the distance may be determined using location data or more particularly, GPS (Global Positioning System) data received and/or analyzed by a processor of the navigation unit 122.

In an embodiment, the battery 118 provides electrical energy for operation of the vehicle 100. The battery 118 may be any rechargeable battery that is capable of being utilized in the vehicle 100. The battery 118 may be charged, for example, using a generator or a motor-generator. The battery 118, as in, for example, an all-electric or a plug-in hybrid vehicle, may be charged using an external charger coupled to the charger 112 or the battery 118.

The electrical energy consumption can be determined by measuring the electrical energy in and out of the battery 118. A change in the level of a state of charge (SOC) of the battery 118 may indicate an electrical consumption rate or amount. The BMS 114 may measure, using battery sensors, parameters that are used to determine the SOC of the battery 118. The battery sensors may measure a voltage, a current, a temperature, a charge acceptance, an internal resistance, self-discharges, magnetic properties, a state of health and/or other states or parameters of the battery 118. In an embodiment, the ECU 102 may determine an SOC percentage or ratio of the battery 118 based on an energy value stored in the battery 118 or the vehicle 100 relative to the current charging capacity of the battery 118.

In an embodiment, the SOC may be determined based on the stored energy value relative to a reference capacity for the battery 118 stored in the memory 124. In an embodiment, the SOC may be measured as a percentage or a ratio relative to another predetermined value associated with the battery 118. Other systems or methods known in the art for determining electrical energy consumption percentage, value or number may be utilized in the vehicle 100 without limiting the scope of the present invention.

The ECU 102 may determine the fuel-equivalent consumption rate of the electrical energy consumption based on the variation in the SOC of the battery 118. For example, a 33.7 kW-h change in the SOC may correspond to energy stored in approximately one gallon of gasoline. The consumed electrical energy may be converted into a fuel-equivalent amount of energy and added with the fuel consumption sum amount to obtain a fuel-equivalent total energy consumption sum amount. Once the total number of gallons or liters of a fuel-equivalent total energy consumption sum amount is determined, the ECU 102 may divide the travelled distance (miles or kilometers) by the amount of energy of the fuel-equivalent total energy consumption sum amount (gallons or liters) to determine a fuel-equivalent distance-per-energy consumption rate, e.g., in miles per gallon equivalent (MPG-e) or kilometers per liter equivalent (km/l-e). The vehicle 100 may determine and display a fuel-equivalent distance-per-energy consumption rate by converting energy consumption in various forms of energy into a fuel-equivalent energy consumption rate or amount.

The battery 118 may be coupled to an external charger before the departure time of the vehicle 100. The stored electrical energy may be obtained through charging using an external power source, fuel consumption energy from the engine 106, energy generated by the energy generation unit 110 (e.g., via regenerative braking) or other means. In an embodiment, the battery 118 may also be a capacitor which may be charged by an energy generation unit 110. The energy generation unit 110 may include a solar panel, a ram induction generator, a regenerative braking unit, a heat exchange unit or combinations thereof. The vehicle 100 may also include a catalytic converter connected to the engine 106 to generate heat used by the energy generation unit 110 to charge the battery 118. The energy generation unit 110 may charge the battery 118 using a generator and/or the motor-generator discussed above. In an embodiment, in addition to the fuel consumption and electrical energy consumption discussed above, the ECU 102 may determine the fuel-equivalent non-fuel energy consumption by further taking into account the energy generated by the energy generation unit 110 and the energy conversion efficiency of the energy generation operation.

An energy efficiency value (e.g., MPG-e, km/l-e, or another parameter) may take into account fuel energy consumption, electrical energy consumption, and/or energy regeneration and may be computed in real time. The determined energy efficiency value may be continuously and/or periodically updated and used as feedback for adjusting vehicle operations. Various other methods of taking into account overall energy efficiency may be utilized without limiting the scope of the present invention. The energy efficiency value may be determined, for example, for a distance travelled over a particular route segment, a route and/or a route set.

The vehicle 100 may further include a navigation unit 122 connected to the ECU 102. The navigation unit 122 may further include a display for interacting with the driver by displaying information as discussed below and/or by accepting inputs, for example, via a touch-screen display. In an embodiment, the navigation unit 122 may include a display for providing a visual output such as, for example, maps, navigation, directions, entertainment, information, or combinations thereof. The displayed data described herein may refer to data displayed on the display 104, the display of the navigation unit 122, a display of a portable electronic device 128 (such as smart phone in communication with the processor), and/or combinations thereof.

The navigation unit 122 may access GPS data for route prediction. The navigation unit 122 may be integrated in the vehicle 100 or a separate unit coupled to the vehicle 100 or in communication with the ECU 102. In an embodiment, the navigation unit 122 is integrated in a portable electronic device 128 (e.g., a smartphone or a tablet computer). The navigation unit 122 may include a memory and a processor for performing all or some of the specific steps described herein in conjunction with the ECU 102.

Hereinafter, a "processor" may refer to the ECU 102, the processor of the navigation unit 122, a processor of the portable electronic device 128, another processor, or combinations thereof operating in conjunction with one another and configured to perform the steps described herein. For example, some of the steps described herein may be performed by the ECU 102, some of the steps may be performed by the processor of the navigation unit 122, and some of the steps may be performed by the ECU 102 and the processor of the navigation unit 122 communicating and operating in conjunction with one another. The processor may be any type of hardware or circuit capable of performing the method steps described, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processor may be connected to the memory 124. In addition, the navigation unit 122 may incorporate a memory connected with the processor or embedded as part of the processor of the navigation unit 122. Hereinafter, the "memory" may refer to the memory 124, the memory of the navigation unit 122, a memory of the portable electronic device 128, a remote memory in communication with the processor, and/or combinations thereof for storing the various information or data used in the predictive process and/or for storing instructions for the steps performed herein. The memory may include off-board memory in communication with the vehicle 100 via wireless communication and/or cloud-based technology.

Figure 2:
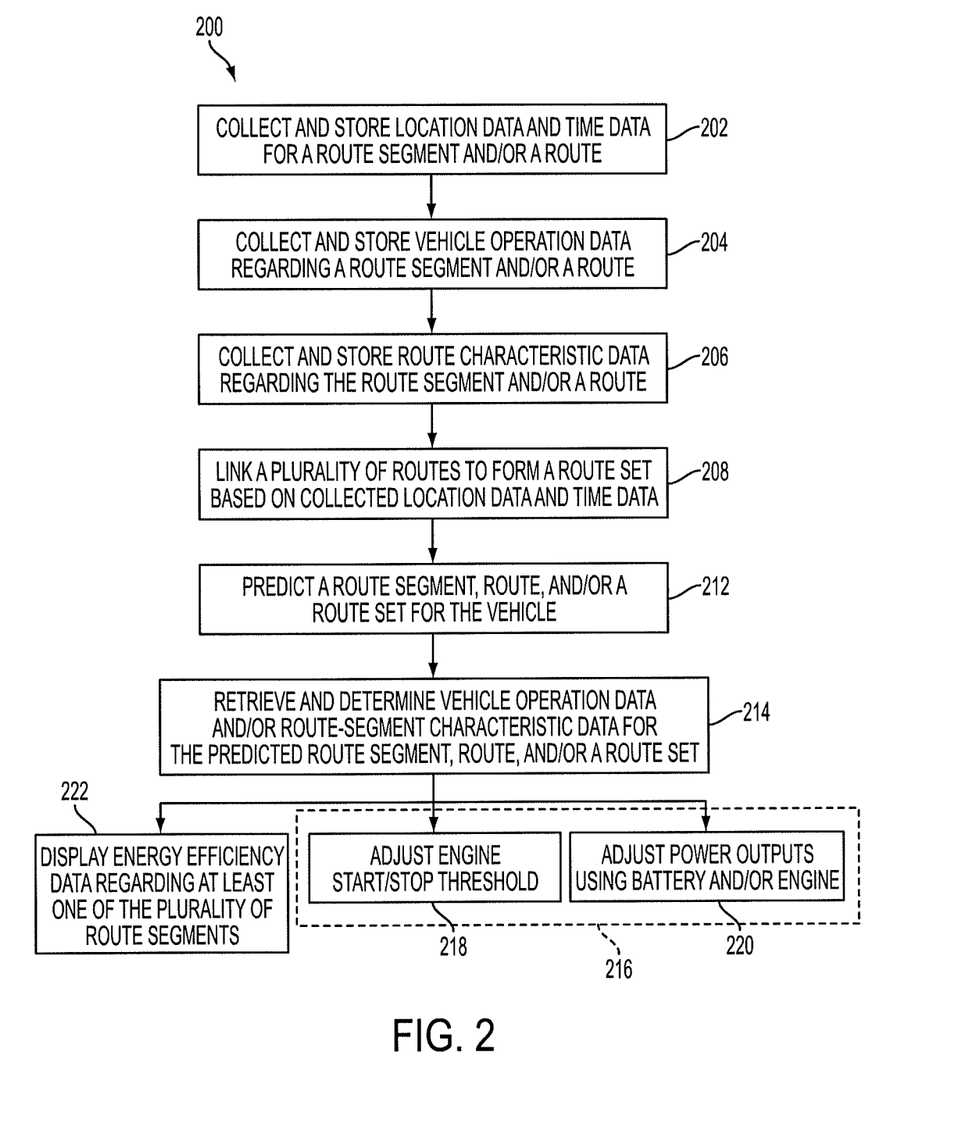
FIG. 2 is a control logic block diagram illustrating a method of adjusting a vehicle operation based on predicted route segments, routes and/or route sets according to an embodiment of the present invention.

FIG. 2 is a control logic block diagram illustrating a method of adjusting a vehicle operation based on a predicted route segment, a route and/or a route set according to an embodiment of the present invention.

Referring to step 202, the processor may collect information regarding a route segment and/or a route using the sensors 120 and/or the navigation unit 122. A route, as used herein, may refer to a distance travelled between an event signaling a beginning of a trip and an event signaling an end of a trip. For example, such an event may be that the ignition is turned on and subsequently turned off. Also, such an event may be that a door of the vehicle 100 is opened and then shut, and then the door is subsequently opened and shut. The time and/or location of each event may be recorded. "Time," as used herein, may refer to a time of the day, a day of the week, a date or any other temporal parameter that may be stored regarding a route segment, a route and/or a route set. A "location," as used herein, may refer to latitude or longitude coordinates, a GPS location, a location determined in reference to other known locations, or any other location data regarding the vehicle 100, the route segment, the route and/or the route set.

In an embodiment, by recording each event in the memory, the location of each event, and/or the time that the recorded event takes place, the processor may establish a known route. The processor may store the start/stop location and the start/stop time of each route in the memory and assign each route a unique route identifier. Each route may further include a plurality of route segments. Each route segment may also have a unique route segment identifier. A route set may include a number of different routes linked with one another as described below in more details with respect to step 208. Distance information regarding the route segment, the route and/or the route set may be stored in the memory. In an embodiment, the distance may be determined by integrating vehicle speed. In an embodiment, the distance may be determined based on the distance between GPS locations. The distance values may be summed to obtain a distance of a route set that includes linked routes as discussed below with respect to step 208. The time between the beginning and end of the routes and/or the route sets may also be stored.

In an embodiment, as the vehicle 100 travels on a route, the GPS coordinates of the locations on the route are recorded and time-stamped. Using the location data and the time data, the processor may differentiate between various route segments and store data regarding the route segments. For example, a new route segment may begin when the vehicle 100 makes a new turn (as determined, for example, by the heading data and/or changes in latitude and longitude), and when the turn angle is sharp enough to exceed a turn threshold value. For example, in city driving, as the vehicle 100 turns into different streets, each of those streets may be stored as a route segment. In an embodiment, the route segments may be based on turns and GPS locations without necessarily utilizing GPS map data (for example, regarding the mapping of the streets). In an embodiment, both the turn detection and GPS map data (for example, information about terrains and/or street characteristics) may be utilized for differentiating between the route segments and/or for storing information regarding the route segments.

In an embodiment, in addition to or instead of the turn detection, the driving time may be compared to a driving time threshold to divide routes into various route segments. For example, if a long road is driven for 100 miles (roughly 161 km) without making any turns, the 100-mile (161 km) drive may be broken up into different route segments. For example, every 5 miles (8 km) or 10 miles (16 km), the route may be segmented. The threshold values are presented merely as examples for illustration of the route segmentation process. Other thresholds and different parameters may be utilized to divide the routes based on design concerns or criteria.

For example, one design concern may be to improve data storing efficiency by discretizing the routing data. For example, a part of a street may be a part of a number of different routes depending which way the vehicle 100 turns. This segment can be used for multiple routes without inefficiently re-recording the route segment. For example, a route list and a route segment list may be stored in the memory, and each route data entry may include a route identifier and an ordered list of route segments. The ordered list of route segments may include an ordered list of segment identifiers, where each segment identifier corresponds to a segment stored in the segment list of the memory.

Another design concern may be to divide a route into a different route segment such that a new route segment provides new information useful for optimizing energy efficiency during future travel on the route segment. The route segmenting may also assist in future prediction or confirmation that the vehicle 100 is indeed travelling on a given route.

When the vehicle 100 drives on a route segment, the distance of the route segment is known. Other information may be recorded about a particular route segment and/or a route. For example, the average speed of the vehicle in the route segment and/or the route may be calculated (for example, by processing data collected by the vehicle speed sensor). Each route segment may include a route segment identifier, a route segment distance, one or more "to" segments, one or more "from" segments, and a plurality of locations. The route segment distance may be representative of the total distance of the route segment (e.g., the distance from the starting location of the route segment to the ending location of the route segment, or the sum of the distances between each pair of successive locations in the route segment). The one or more "to" route segments may include route segment identifiers for route segments that have been historically travelled immediately after the route segment. The one or more "from" segments may include route segment identifiers for route segments that have been historically travelled immediately before the route segment. Some of the data stored for the routes and/or the route segments may be determined based on GPS data and/or data detected by sensors 120 (e.g., gyroscopes, accelerometers, or the like).

The following example (hereinafter referred to as example (a)) is provided to merely illustrate how the described method can be applied in a particular set of circumstances without limiting the scope of the present invention. For example, assume that a driver leaves his/her house around 7:15 in the morning every weekday to go to work. Further assume that on his/her way to work, the driver drives up a hill to a coffee shop, stops the vehicle 100, gets out of the vehicle 100 to grab a cup of coffee, then starts the vehicle 100, and heads down the hill towards his workplace. Assume also that on Mondays and Wednesdays the driver goes to the gym after work before heading home, and on Tuesdays, Thursdays and Fridays, the driver goes straight home after work. The processor, over time, may identify the following known routes: drive from home to the coffee shop ("KRa1"); drive from the coffee shop to work ("KRa2"); drive from work to the gym ("KRa3"); drive from the gym to home ("KRa4"); and drive from work to home ("KRa5"), wherein KR refers to a route, (a) refers to example (a), and the routes are numbered 1-5 for identification purposes.

The processor may further store various types of data regarding the known routes KRa1-KRa5 or the route segments thereof in order to utilize the stored information in the future when the processor predicts that the vehicle 100 will travel over the known route segments and/or known routes. For example, start time, end time, start location, and/or end location of each of the KRa1-KRa5 routes may be stored in the memory.

Each of KRa1 to KRa4 routes may include one or more route segments. For example, the drive from the coffee shop to work (KRa2) may be divided into various route segments based on the turns and/or the distance driven on a particular street, as discussed above. Each of the KRa1-KRa5 routes may include a list of their corresponding route segments, as discussed above. As discussed below with respect to step 208, the routes may be linked (for example, using corresponding location data and/or time data) to form a route set stored in the memory.

Referring to step 204, the processor collects and stores vehicle operation data for the route segment and/or the route. For example, the processor may determine (using for example, data collected by sensors 120) how the fuel (such as gas) and the battery 118 are consumed historically over a route segment and/or a route. For each route segment, route and/or route set, the energy efficiency value may be determined based on fuel flow, electrical energy consumption (based on, for example, the SOC), consumption or regeneration of other forms of energy and/or on-board distance measurement signals that correspond to the given route and/or route segment, as discussed above with respect to FIG. 1. The processor may store the energy efficiency value for each route segment, route, and/or the overall route in the memory.

For example, an energy efficiency value may be determined for each of the routes KRa1-KRa5, and/or for different route segments of KRa1-KRa5. In addition, for example, the energy efficiency for a route set may be stored. The route set may be, for example, a set of routes linked as described below with respect to step 208. The route set may be, for example, KRa1, KRa2, KRa3 and KRa4 linked with one another. An energy efficiency value for completing the route set (including KRa1-KRa4) may be stored and assigned to the route set instead of or in addition to energy efficiency values stored for each individual KRa1-KRa4.

As discussed above with respect to FIG. 1, various energy efficiency parameters or values may be utilized to determine not only the amount of fuel (e.g., gasoline used), but also the amount of electrical energy used (for example, from the battery 118). For example, the SOC and an amount of electrical energy consumption may be stored for a given route segment and/or route may be utilized. Inefficient operation states may be recorded over a give route and/or route segment. For example, an overheated battery state or an overly charged battery condition may be stored. If the SOC exceeds a particular threshold or reaches a full battery condition, such information may be stored for a given route segment and/or route in order to prevent, for example, the full battery condition by preparing in advance for the full battery condition. The fuel flow information, fuel consumption information, MPG based on fuel consumption, and the like may be stored for a given route segment, route, and/or route set and utilized when the processor predicts that the vehicle 100 will travel the route segment, a route, and/or a route set. The processor may further store the engine operating time and number of engine starts/stops as this information may also be utilized for determining energy efficiency and as feedback for optimizing energy efficiency in the future. In an embodiment, the energy efficiency value may also take into account efficiency of overall energy which includes electrical energy, fuel energy, and optionally other forms of energy. For example, the energy efficiency value may be a fuel-equivalent energy efficiency value such as MPG-e or km/l-e as discussed above (which takes into account both fuel and electrical energy consumption).

Various other detected and/or calculated parameters may be utilized to keep track of how fuel is being consumed and how electrical energy is being consumed over a given route segment, route, and/or route set. This information serves as feedback data for balancing the power needs of the vehicle 100 when the processor predicts that the vehicle 100 will travel on the given route segment, route, and/or route set. For example, the processor may prepare in advance for the route segment, route, and/or route set in order to optimize energy efficiency.

Referring to step 206, the processor may optionally store route characteristic data regarding the route segment, route, and/or route set. For example, traffic/construction conditions or alerts, road conditions, maneuverability conditions, places of interest to the user and/or other information regarding the route segments, routes, and/or route sets may be stored. For example, KRa1 may be stored in the memory along with information regarding the slope of the hill, traffic on KRa1, and/or other characteristics of the route. Traffic conditions may be obtained, for example, from a remote server 126 in communication with the processor or the navigation unit 122. The remote server 126 may be connected to the processor via wireless communication, the internet, cloud-based communications, and/or using any other data communication link as known in the art.

Referring to step 208, the processor may be further configured to analyze known route segments and/or routes and link the routes together by using the time and the location of the respective known routes to form a route set. For example, the processor may link a first known route with a second known route (e.g., a subsequent known route) by analyzing the first and second known routes based on a linking threshold. The linking threshold may be, for example, based on the probability of a subsequent known route being driven. In an embodiment, when the processor determines that the first known route and the second known route fall within the linking threshold, the vehicle operates under the condition that the second known route will probably be driven after the first known route. The first known route and the second known route may form a route set. For example, if a driver stops by the same coffee shop every weekday morning before heading to work, then the route from the coffee shop to work would be a known route subsequent to the initial route from home to the coffee shop, and the processor would link the two routes accordingly. In another example, the processor may store a link including the time data. For example, if the driver goes to a particular coffee shop only on Saturdays, the processor may store a link for the route of home to the coffee shop and the route of the coffee shop to work along with the time data indicating that the route is travelled only on Saturdays.

Referring to example (a) discussed above, the processor may recognize, using a linking algorithm, that on Mondays and Wednesdays, a route set includes the following first group of routes: KRa1, KRa2, KRa3 and KRa4, and on Tuesdays, Thursdays and Fridays, a route set includes the following second group of routes: KRa1, KRa2 and KRa5. The linking algorithm may be based on the known routes (KRa1-KRa5) and their corresponding start/stop locations and/or start/stop times.

The route sets may be combined to form a round trip, for example, based on a return of a driver to a starting location (e.g., home) and/or based on driving profiles over a predetermined period of time. A route set may or may not be a complete round trip. For example, the route set of KRa1, KRa2, KRa3 and KRa4 is a round trip as the driver starts from home in KRa1 and reaches home at the end of KRa4.

The linking threshold for forming a route set may be based on start/stop locations of routes and/or their corresponding route segments, start/stop times of routes and/or their corresponding route segments, frequency of stopping/starting, other factors, and combinations thereof. For example, in order to link KRa1 and KRa2, the processor may check whether the end location of KRa1 matches (or is very close to) the start location of KRa2. For example, this step ensures that there was no driving in between KRa1 and KRa2 that was not recorded. The linking threshold may be based on timing of the routes, and for example, based on start/stop times of the routes and/or the time period between the routes.

In an embodiment, the link type data may be stored, for example, when routes and/or route segments are linked. The following example (hereinafter referred to as example (b)) is provided to illustrate how links may be categorized in a particular set of circumstances without limiting the scope of the present invention. Assume a driver drives from home to a grocery store ("KRb1"), shops for 20 minutes, and drives back home ("KRb2"). There is a 20-minute gap between the two routes KRb1 and KRb2. Here, the end location of the first route KRb1 matches the start location of the return route KRb2, and the link between KRb1 and KRb2 may be stored. For example, the time period may be compared with a time period linking threshold to categorize the link. Further assume that the driver drives from work to home ("KRb3") and then stays overnight at home for 12 hours, and then drives from home to work in the morning ("KRb4"). The link between KRb1 and KRb2 may be stored and categorized differently than the link between KRb3 and KRb4. One reason for categorizing the two links differently is that a different control strategy may be appropriate for each link type. For example, when the time period is long (e.g., as in time period between KRb3 and KRb4), it would be energy efficient for the vehicle 100 to utilize this information and prepare for KRb4 in advance, for example, during KRb3, prior to the time period, as discussed below with respect to step 216.

For example, to illustrate the link type concept without limiting the scope of the present invention, there may be 4 categories of routes in terms of time period: 1—links with less than or equal to 30-minute time period, 2—links with time periods greater than 30 minutes but less than or equal to 2 hours, 3—links with time periods greater than 2 hours, but less than or equal to 8 hours, and 4—links with time periods greater than 8 hours. In terms of vehicle control strategy, the processor may treat the category 1 links as if there was no stopping between the two linked routes. Category 2 links may be treated differently because for example, the soak time of the engine 106 may be significantly higher than the soak time in category 1 links, thereby requiring a different control strategy to enhance energy efficiency. In other words, in category 2 links, the engine 106 has to expend more energy to re-warm up again after the 30 minute to 2-hour gap as compared with category 1 links wherein the engine is still warm after the short time period. The processor may determine that it may not be energy efficient to utilize the engine 106 after the time period of the category 2 link if sufficient battery power is available for the subsequent route after the time period. This control strategy would prevent the inefficiency associated with re-warming up the engine 106 after the cool-down during the 30-minute to 2-hour gap.

The information stored regarding the linked routes and/or linked route segments is utilized to optimize the efficiency of the vehicle. The vehicle operation data and/or the route characteristic data for a given route segment and/or route may be processed in conjunction with one or more linked known route segments and/or routes. Other information about the route set may be stored, as discussed above with respect to routes and/or route segments. For example, the distance, average speed, location data and/or time data regarding the route set may be stored.

Referring to step 212, in an embodiment, the processor searches the database of the memory to determine matching route segments, routes, and/or a route set based on a current location and/or previously or currently driven route segments, routes and/or route sets. The processor may predict that the vehicle will travel on a route segment, route, and/or route set. Information regarding the predicted route segment, route and/or route set may be retrieved for improving an energy efficiency of the vehicle.

In an embodiment, the processor may identify one or more matching route segment candidates from the stored route segment list based on a current GPS location. In an embodiment, the one or more route segment candidates are identified by accessing the route segment list stored in the memory, determining the distances between a current location and each location of each segment in the route segment list, and identifying the one or more route segment candidates at those segments of the segment list that have at least one location within a distance proximity threshold from the second location. For example, in an embodiment, the distance proximity threshold may be 60 meters such that all segments within 60 meters of the current location are identified. In other embodiments, various other thresholds or parameters may be utilized to obtain the segment candidates. Similarly, route candidates may be identified from the route list. For example, the processor may determine which of the routes on the route list include any of the one or more of the identified segment candidates to determine which route the vehicle may be currently on.

The processor may calculate a route weight for each identified route candidate. For example, the route weight may be based on the start/end times, start/end locations, current time, current day of the week, the ratio of the number of times the identified candidate route was travelled to the total number of times any of the candidate routes were travelled, various other factors and/or combinations thereof. For example, the processor may consider what time of the day the route candidate was driven usually in comparison to the current time. The route weight may be a weighting function based on the foregoing corresponding data.

The route segment weights, route weights, list of route segment candidates and/or route candidates may be updated, for example, based on newly collected data (for example, an updated current location of the vehicle). For example, an updated current location may indicate that one of the route candidates is no longer a plausible or probable candidate. The processor considers the weights of the route segment candidates and/or the route candidates and predicts routes and/or route segments by selecting amongst the route candidates and/or route segment candidates, respectively.

Based on the links stored in the memory, the processor may predict which routes will be completed subsequent to a predicted first route, and retrieve information regarding the linked routes and their corresponding route segments. For example, it may be determined that the vehicle will travel on a predicted second route after completing a current first route. The prediction may be based on a current location, a current time of the day, and/or a current day of the week to predict whether a subsequent route will be driven. For example, referring to example (a) set forth above, the method may predict that based on the current location being the home of the driver, the current day being Monday and the current time of the day being 7:15 AM, the following route set will probably be completed: KRa1, KRa2, KRa3 and KRa4. As such, by utilizing times and routes, the vehicle can determine a route set by linking multiple known route segments or routes.

In an embodiment, after the route and/or the route set are completed, the processor may consider the historical data over the route and/or the route set travelled. The processor may compare the route and/or the route set just travelled to the predicted route and/or the route set. If the travelled route and/or the route set and the predicted route and/or the route set match, respectively, no new route and/or route set entry is made, but the information regarding the route and/or the route set may be updated. In an embodiment, a new instance of the same route and/or the route set may be stored when the travelled route and/or the route set matches the predicted route and/or route set, respectively. For example, the new instance may indicate that the driver drove the predicted route and/or the route set on a particular day and time. In an embodiment, to prevent inefficiency in data storage and processing, the location data (e.g., GPS information) do not need to be re-stored. At a later time, the new instance of the route and/or the route set may be utilized in determining frequency of driving when applying the weighting functions for prediction. If the travelled route and the predicted route do not match, the travelled route may be stored as a new route with a new route identifier and corresponding information, as discussed above.

Referring to step 214, when the processor predicts that the vehicle will travel on a route segment, route, and/or route set, the processor retrieves the corresponding vehicle operation data for the corresponding route segment, route and/or route set. For example, the retrieved data may include vehicle operation data (for example, the stored energy efficiency values) for each of predicted route segments, routes and/or route sets. The retrieved data may further include route characteristic data (for example, road and/or traffic conditions) for the predicted route segment, route and/or route set. For example, the retrieved data may indicate that the predicted route of KRa1 will be uphill with certain retrieved traffic conditions, and the predicted route of KRa2 will be downhill with certain retrieved traffic conditions. The route characteristic data may be retrieved from a previously stored database when the route segment, route and/or route set was driven, and/or may be based on current information received from the remote server 126. The information may be utilized to manage an operation of a unit or a device of the vehicle (such as discharge of the battery 118), as discussed below with respect to step 216.

Referring to step 216, for example, the retrieved energy efficiency values and/or the retrieved route characteristic data for a route segment, route and/or route set may be utilized for adjusting vehicle operations and driving performance. For example, energy efficiency information may be utilized as feedback data for improving overall energy efficiency of the vehicle over the course of a route segment, route and/or route set by adjusting powertrain control parameters.

Referring to step 218, for example, the start/stop threshold may be adjusted based on previously collected information regarding electrical energy consumption and/or fuel consumption over a known route segment. Hereinafter, references to a "start/stop" threshold do not necessarily relate to identical start and stop threshold values. In an embodiment, the engine stop threshold may be different than the engine start threshold. In other words, the type of threshold value and the amount of the threshold value may be different for starting the engine than for stopping an operation of the engine 106. For example, as the power request increases, the engine 106 may be started based on an engine start threshold, whereas an operation of the engine 106 is stopped when the power request decreases below an engine stop threshold which may be different from the engine start threshold.

In an embodiment, the energy efficiency value (which takes into account fuel economy and electrical energy consumption) may be compared with an energy efficiency threshold, and the engine start/stop threshold is adjusted based on the energy efficiency value. In an embodiment, the vehicle operation data (for example, the energy efficiency value) may be based on the amount of fuel (e.g., gasoline) consumed, the amount of battery power used, and how the fuel and/or battery power is used for the known route segment and/or route. The processor may also utilize current or previously recorded route characteristic data regarding, for example, traffic on the particular route segment.

In an embodiment, the fuel economy over a route segment may be compared to a fuel economy threshold stored in the memory. If it is determined that the engine fuel economy is low in a given predicted route segment, the minimum power threshold for utilizing the engine 106 may be increased in order to utilize the engine 106 less often and/or to a less degree. For example, data stored regarding a route segment may indicate heavy stop-and-go traffic on the route segment, resulting in poor energy efficiency when the engine is started and stopped numerous times. The processor may adaptively adjust the start/stop threshold (for example, by lowering the start/stop threshold) to prevent the energy inefficiency associated with the numerous starting and stopping of the engine operations.

In an embodiment, the processor may analyze a power request (power demand) based on the engine start/stop threshold. For example, the sensors 120 may include an acceleration input sensor. The acceleration input sensor may be, for example, a gas pedal sensor such that a degree or percentage of depression of the gas pedal is detected. For example, the memory may store a look-up table or map that associates a power request with a gas pedal depression percentage. As the driver depresses the gas pedal, a certain power request is determined. If the power request exceeds an engine start threshold, the ECU 102 may utilize the engine 106 for providing power in addition to power provided using the battery 118.

In an embodiment, the processor analyzes the power demand and the vehicle speed to decide whether the engine 160 should be started or stopped. Feedback regarding fuel consumption of a particular route segment and/or route may be considered in adjusting the start/stop threshold. For example, the processor may record a fuel efficiency value (e.g., MPG or km/l) or an energy efficiency value (e.g., MPG-e or km/l-e) over a route segment or route that the engine was utilized. The processor may compare the fuel efficiency value to a fuel efficiency threshold and/or may compare the energy efficiency value to an energy efficiency threshold and determine that utilizing the engine over the route segment and/or route was inefficient. In one embodiment, if data is recorded regarding a route segment indicating an inefficient use of the engine power, the threshold may be adjusted for the given route segment. In one embodiment, the engine start/stop threshold may be raised in order for the vehicle 100 to operate under EV driving mode (using the battery power) for a longer period before the engine is utilized.

In an embodiment, the memory may store a speed threshold. In an embodiment, a look-up table or map may be stored in the memory having vehicle speed as an axis of the look-up map and power request as another axis based on the acceleration input (detected, for example, using the acceleration pedal). As such, the engine start/stop threshold may be a power request threshold that may change based on the current vehicle speed. In an embodiment, regardless of the power request, the engine 106 has to be started when the vehicle speed increases to a value above the vehicle speed threshold.

The vehicle speed threshold may be adjusted to be at a higher speed such that the EV driving mode would be available at higher speed periods as compared with when the information regarding the predicted route segment would not be available. The start/stop threshold may be adjusted based on various factors in addition to or instead of the power request and/or the vehicle speed.

For example, assume that data is recorded regarding a route segment that has a speed ramp before merging onto a freeway. To travel up the speed ramp, the vehicle 100 normally utilizes power provided from the engine 106 as the user depresses the gas pedal to pass the speed ramp. The processor may retrieve information regarding the speed ramp before approaching the speed ramp using previously collected data regarding the route segment. The processor may determine that beyond the speed ramp, it is best for the vehicle 100 to travel in EV mode. The processor may raise the start/stop threshold to keep the vehicle 100 operating in the EV mode during travelling over the speed ramp.

For example, assuming that under normal driving conditions, it may take 20 kW (kilowatts) to drive the vehicle 100, when the user depresses the gas pedal, the demand increases to 50 kW. If the threshold is 40 kW, the user may depress the gas pedal only for a few seconds enough to be above 40 kW and then the power request goes back to 20 kW for driving on the freeway. When the route segment is predicted, the processor may access this information because peak power requests for the route segments and/or routes are stored in the memory as discussed above. For example, a peak power request of 50 kW and a corresponding duration of 3 seconds may be retrieved from the memory. Since the processor has learned from historical data that the user will only request the high power above the threshold for only 3 seconds, the processor may raise the engine start/stop threshold, for example, to a value above 50 kW to avoid utilizing the engine 106 for only a very short time period.

In certain circumstances, the engine start/stop threshold may be decreased increased. For example, in a heavy traffic condition, the engine 106 may get started and stopped numerous times as the engine start/stop threshold is crossed numerous times. For example, the processor may compare the number of start/stops to an energy efficiency start/stop threshold. In other words, when the number of start/stops over a given route segment and/or route exceeds the energy efficiency start/stop threshold, the processor may determine that the engine 106 inefficiently started and stopped too many times (as judged by the energy efficiency start/stop threshold). Increasing the engine start/stop threshold may help avoid the fuel inefficiency caused by numerous starting and stopping of the engine 106. In yet another example, when driving on a known route segment which may be a highway, the stop/start engine threshold may be lowered where the historical fuel economy over a given route segment indicates that the battery power is not sufficient for operating the vehicle. As a result, the engine 106 is utilized to power the vehicle 100 in addition to or instead of utilizing the battery 118 to power the vehicle 100.

When driving on a known route segment which may be a highway (as indicated by the route characteristic data for a known route segment), the stop/start threshold may be lowered where the historical fuel economy over a given route segment indicates that the battery power is not sufficient for operating the vehicle. As a result, the engine 106 is utilized to power the vehicle 100 in addition to or instead of utilizing the battery 118 to power the vehicle 100.

The engine start/stop threshold may further depend upon the battery capacity or SOC. For example, it may be inefficient to switch numerous times between utilizing battery power and engine power, which would warrant adjusting the engine start/stop threshold to keep the engine 106 on. However, if the SOC is very high, the processor may decide to utilize the battery 118 to deplete some of the electrical energy. For example, this would be the case when the processor predicts that an energy regenerating route segment is approaching (for example, downhill driving), and it is preferable for the battery 118 to be depleted. For example, if the SOC is below a certain charge threshold, the processor may decide to keep the engine 106 on by lowering the engine start/stop threshold. But if the SOC is above a certain charge threshold, and the battery 118 has sufficient electrical energy stored for depletion, the processor may decide to enter EV driving mode by raising the engine start/stop threshold.

In a particular set of circumstances, historical data for routes and/or route segments may show that although a high amount of battery power is used over the route and/or route segment, there may be sufficient energy regeneration activity to raise the start/stop threshold of the engine 106 such that the engine 106 is not engaged and battery power is utilized.

As a result, the processor can efficiently balance the power utilized from the engine 106 and the power utilized from the battery 118 based on the current state of the vehicle 100 (e.g., current SOC of the battery 118) and based on historical data of the predicted routes. An objective of the control strategy is to improve the MPG-e, km/l-e, or similar overall energy efficiency metrics for the predicted route and/or route segment as compared with the previous time(s) the route and/or route segment were travelled.

In an embodiment, the engine start/stop threshold may be adjusted based on the route characteristic data for a known driving route segment and/or a known driving route. The route characteristic data may indicate that the vehicle 100 will be driving in a city environment. The processor may determine that in city environments, it may be more efficient to utilize the battery 118 more than in normal conditions during which the environmental information is not available. For example, energy drawn from the battery 118 may be higher than energy produced by the engine 106. The battery use for the given route segment may be used to adjust the stop/start threshold of the engine 106. The amount of power outputted using the engine 106 versus the power outputted using the battery 118 may also depend on the type of vehicle 100. For example, in a plug-in hybrid vehicle, the electrical energy may not derive from the engine 106 whereas in a hybrid vehicle without the plug-in feature, the electrical energy necessarily derives from the engine 106.

Referring to step 220, the power drawn using the battery 118 and the power drawn using the engine 106 may be adjusted based on retrieved vehicle operation data, route characteristic data, location data, time data, and/or other information regarding the predicted route segment, the route, and/or the route set. In an embodiment, the discharge of the battery 118 may not be directly controlled. Rather, the control commands of the battery 118 may be a result of how the engine 106 is utilized. For example, the less power the engine 106 provides, the more battery power is drawn automatically using the motors/generators in order for the total power output using the engine and the battery to meet the power demand. In an embodiment, to reach a desired battery discharging powering command, the appropriate engine power output is determined.

In an embodiment, when the predicted route is driven and information is retrieved about the route indicating that an SOC overflow is expected, the processor may prevent this inefficient condition by, for example, depleting the battery at an earlier stage and to a greater extent.

Referring to example (a) set forth above, the vehicle 100 may be configured to utilize only battery power without utilizing the engine 106 for driving the vehicle 100 when driving on the uphill KRa1 route because the processor predicts that the vehicle 100 will subsequently drive on KRa2 downhill route which regenerates electrical energy for storage in the battery 118 through regenerative braking. The vehicle operation may also be adjusted on the predicted distance of a predicted route set (e.g., KRa1 and KRa2).

In an embodiment, it may be determined that based on the predicted routes, the vehicle 100 will reach a charging point (such as home or a recharging station). With this information and in anticipation of the charging point, the vehicle may deplete the battery in advance to a greater extent than if the information regarding the approaching recharging point were not available in order to enhance overall energy efficiency.

For example, a route segment may be identified that is associated with high fuel consumption. This information may be stored and analyzed such that more electrical energy is utilized (if efficient to do so) when it is predicted in the future that the vehicle will be travelling on this route.

As such, the stored information about the route segment, route and/or route set may help the processor decide how much to draw from the battery 118 and how much energy to draw from the engine 106 based on historical data.

Referring to example (b) set forth above, the processor may predict a category 4 time period between two successive routes (for example, 12 hours). The soak time is significantly high for the overnight stay. The processor may prepare in advance for KRb4 before KRb3 is completed. For example, assume that the driver in example (b) lives at the top of a hill. Every morning when driving on route KRb4, the driver drives down the hill. Without knowledge of the historical data, the battery 118 may be already full, and it may not be able to regenerate any energy to store in the battery 118. The processor may deplete the battery 118 on KRb3 before the driver reaches home to open up charge storage space in the battery 118 for regenerative energy storage during KRb4.

In another example, assume the processor predicts that the soak time will be high and the engine 106 will cool down. If there is an option to choose EV driving mode (that is, for example, the SOC is high enough for EV driving during the subsequent route), then charge of the battery 118 may be saved for the second route when the engine 106 has cooled down after the soak time such that the engine 106 would not have to be utilized. As a result, the overall energy efficiency would be improved because the inefficiency for warming up the engine 106 would be avoided.

In yet another example, assume a driver charges the vehicle 100 at a charging station at his/her work place, and assume the vehicle 100 has 10 miles (16.09 km) of EV driving range after the vehicle 100 is charged at the work place. Furthermore, assume that after work, the driver drives to a gym that is 20 miles (32.18 km) away from his/her work place, and the gym is in close proximity of his/her home (for example, the gym is only 3 miles (4.8 km) away from his home). Furthermore, assume that the vehicle 100 remains at the gym for a long enough time (e.g., during the driver's 2-hour work-out at the gym) such that the engine 106 cools down before heading home. When driving from work to the gym, the vehicles known in the art would deplete the battery charge and use the 10 miles (16.09 km) driving range during the route from work to the gym. The vehicles known in the art would inefficiently re-start and re-warm the engine 106 for operation during the short drive from the gym to home. In an embodiment of the present invention, the processor learns the location data regarding the length of the routes and learns the time data regarding the time period between the routes (e.g., the 2-hour time gap). The processor predicts the routes and may save sufficient charge of the battery 118 for the route from the gym to home if possible (based on, for example, the available charge of the battery 118), thereby preventing or reducing the energy inefficiency associated with re-starting and re-warming the engine 106. In other words, the processor manages engine power and battery power during the route from the work place to the gym such that enough EV driving range remains for the route from the gym to home. For example, the vehicle 100 may reserve at least 3 miles (4.8 km) of the EV driving range for the route from the gym to home to avoid inefficiencies associated with re-warming the engine 106.

Conversely, in another example when the soak time is very low (for example, in category 1 as discussed above), the engine 106 is still warm, and the processor may determine that it is not inefficient to utilize the engine 106 from the beginning of the subsequent route after the short time period.

For a plug-in hybrid vehicle, with, for example, 20 miles (32.2 km) of EV driving, the default control strategy may be to deplete the 20 miles (32.2 km) of electrical charge at a fast pace. In an embodiment of the present invention, when the processor predicts that the vehicle will travel over a long route set, the processor may manage discharging of the battery more efficiently by spacing out the discharge of the battery or discharging the battery at a lower (e.g., slower) rate.

Referring to example (b) set forth above, further assume that the commute from home to work KRb4 includes a mile of city road/driving and 20 miles (32.2 km) of freeway to get to work, and the drive from work to home KRb3 also involves 20 miles (32.2 km) of freeway and a mile of city driving. Under default settings, a vehicle that has 20 miles (32.2 km) of EV driving and without information regarding the route set may discharge the 20 miles (32.2 km) of EV driving at a fast pace during KRb4. But in an embodiment of the present invention, the processor may recognize that charging is performed at home (not at the work place) and space out the 20 mile (32.2 km) of EV driving more efficiently. For example, the processor may utilize the EV driving for the city and utilize the engine 106 on the freeway. As a result, enough battery charge will be left on the drive back home KRb3, thereby rendering the overall route set from home to work and from work to home to be more energy efficient in terms of both electrical and fuel energy consumption.

In step 222, corresponding energy efficiency values for previously driven route segments may be retrieved and displayed. The data may be displayed using the display 104, the display of the navigation unit 122, a display of a portable electronic device 128 (such as smart phone in communication with the processor), and/or combinations thereof. For example, the processor may determine MPG-e values, km/l-e values, and/or other parameters indicating overall energy efficiency and/or how and to what extent electrical and fuel energy have been consumed may be determined for a route segment, route and/or route set. These parameters may be displayed using the display 104 and/or the display of the navigation unit 122. The display may further indicate what route segment, route and/or route set the displayed energy efficiency value correspond to. The driver can adjust his/her driving behaviors over the route segment, route and/or route set by evaluating the displayed energy efficiency data.

The displayed energy efficiency information may be in terms of values or display indications based on the energy efficiency values. For example, a "heat map" may be displayed using the display and/or the display of the navigation unit. The heat map may display energy efficient route segments in different colors or schemes than energy inefficient route segments. The particularly efficient or inefficient regions may be highlighted.

In an embodiment, the display may show instantaneous feedback of MPG-e, km/l-e or other energy efficiency values as the vehicle 100 is driving over a particular route segment. In an embodiment, after the route is completed, the energy efficiency values for different routes and/or route segments may be displayed. For example, a map may be displayed with various route segments, each having an energy efficiency value.

In an embodiment, the history of energy efficiency values may be displayed. For example, an average energy efficiency value over a route that was recently travelled may be compared with an average energy efficiency value of previous times that the vehicle travelled over the same or similar route. This would allow the driver to determine whether the driver was driving over the recently travelled route segment and/or route efficiently as compared with historical data, thereby allowing the driver to improve driving habits to optimize energy efficiency.

In an embodiment, the steps described above with respect to route prediction and storage of data regarding the routes and route segments in the database may be performed by the processor of the navigation unit 122. In an embodiment, the GPS device may be integrated in a portable electronic device 128 (such as a smart phone or a tablet), and the steps described above may be performed by the processor of the portable electronic device 128. The processor of the navigation unit 122 and/or the portable electronic device 128 may provide information about the predicted routes and linked routes to the ECU 102 (for example, a hybrid control ECU). These steps can be performed in a single processor or ECU without limiting the scope of the present invention.

The steps described above with respect to FIG. 2 may not necessarily be performed in the order presented above. For example, the routes may first be linked into a route set in step 208, and then information (e.g., vehicle operation data, route characteristic data, etc.) may be stored for the linked route set as set forth above with respect to steps 204 and 206.

Figure 3:
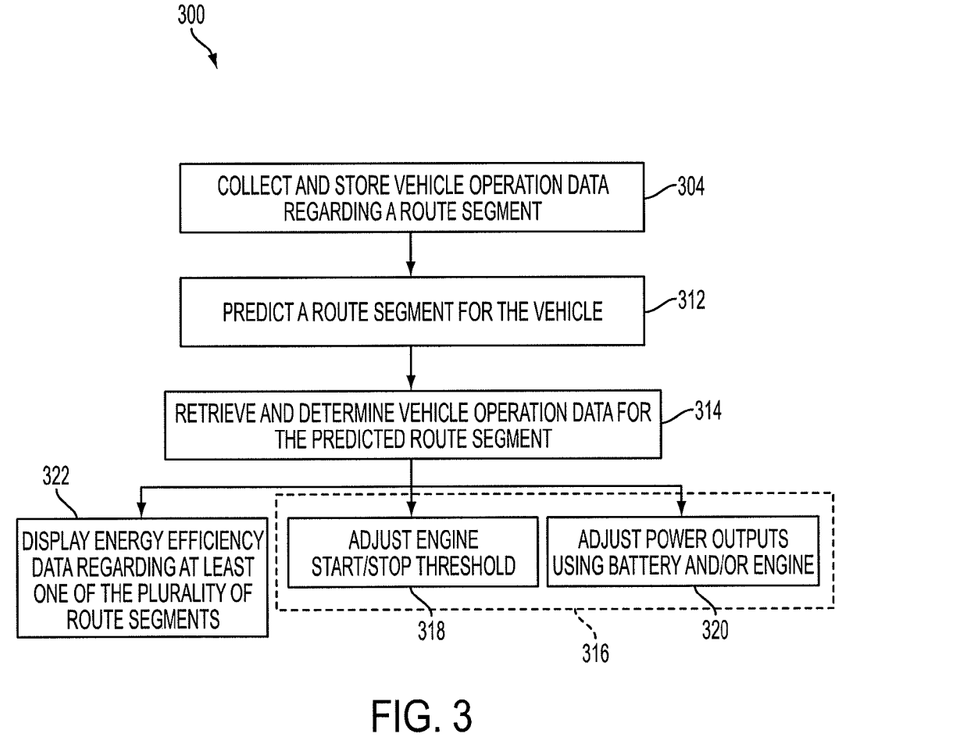
FIG. 3 is a control logic block diagram illustrating a method of adjusting a vehicle operation based on predicted route segments according to an embodiment of the present invention.

In certain embodiments, one or more of the preceding steps may be eliminated or adjusted in order to reduce the amount of data stored, simplify the processing of data for prediction, simplify the control operations for enhancing energy efficiency, and/or various other design concerns or criteria. For example, the vehicle control operations may be based on vehicle operation data learned regarding the route segments without reliance on the route linking algorithm. For example, FIG. 3 is a control logic block diagram illustrating a method of adjusting a vehicle operation based on predicted route segments according to an embodiment of the present invention.

In step 304, the processor may store vehicle operation data regarding a route segment similarly to step 204 discussed above. The information regarding the routes and/or linked route sets may not be utilized in this embodiment. In step 312, the processor may predict that the vehicle 100 will travel on a known route segment, similarly to the process discussed above with respect to step 212. For example, the prediction may be based on the current location and/or time and stored location data and/or time data regarding the known route segments. In step 314, the processor may retrieve and determine vehicle operation data for the predicted route segment similarly to the process discussed above with respect to step 214. For example, the energy efficiency of utilizing the engine 106 over the particular route segment may be retrieved. In step 316, the retrieved vehicle operation data may be utilized for adjusting vehicle operations and driving performance similarly to the process described above with respect to step 216. In steps 318 and 320, the operations of the engine 106 and/or the motor 130 may be controlled similarly to the process described above with respect to steps 218 and 220. For example, if the energy efficiency of utilizing the engine 106 is poor over a particular known route segment, the engine start/stop threshold may be adjusted to utilize less power provided by the engine 106 and to utilize a greater amount of power provided using the motor 130 and the battery 118. In step 322, the energy efficiency data for currently and/or previously driven route segments may be displayed as set forth above with respect to step 222 of FIG. 2. The steps described above with respect to FIG. 3 may not necessarily be performed in the order presented above.

The logical modules and steps for the vehicle 100 described in connection with the examples disclosed above may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method of optimizing energy efficiency of a vehicle with an engine and a motor, for known route segments or routes, the method comprising:

storing, in a memory, vehicle operation data for a known route segment or a known route previously travelled by the vehicle, the vehicle operation data including an energy efficiency value when the known route segment or the known route was previously travelled by the vehicle, the energy efficiency value corresponding to a power output by the engine and a power output by the motor when the known route segment or the known route was previously travelled by the vehicle;

providing a processor connected to the memory, the motor, and the engine of the vehicle;

determining, using the processor, whether the energy efficiency value is below an energy efficiency threshold;

determining or predicting, using the processor, that the vehicle will travel over the known route segment or the known route; and adjusting, using the processor, the operation of the engine and the motor to optimize the energy efficiency of the vehicle before or when the vehicle travels over the known route segment or the known route, the adjusting including decreasing a power output by the engine before or when the vehicle travels over the known route segment or the known route relative to the power output by the engine when the known route segment or the known route was previously travelled, and increasing a power output by the motor before or when the vehicle travels over the known route segment relative to the power output by the motor when the known route segment or the known route was previously travelled.

2. The method of claim 1 wherein the step of adjusting, using the processor, the operation of the engine, is based on a number of starts or stops of the operation of the engine during the travelling of the vehicle on the known route segment or the known route, for decreasing or reducing energy inefficiency corresponding to frequent starting and stopping of the engine operation.

3. The method of claim 1 wherein the step of adjusting, using the processor, the operation of the engine, is based on a time period during the travelling of the vehicle on the known route segment or the known route that the engine was in an on state.

4. A method of optimizing energy efficiency of a vehicle with an engine and a motor, for known route segments or routes, the method comprising:

storing, in a memory, vehicle operation data for a known route segment or a known route previously travelled by the vehicle, the vehicle operation data including an energy efficiency value corresponding to power output by the engine and power output by the motor when the known route segment or the known route was previously travelled;

providing a processor connected to the memory, the motor, and the engine of the vehicle;

determining, using the processor, that the energy efficiency value is below an energy efficiency threshold;

determining or predicting, using the processor, that the vehicle will travel over the known route segment or the known route;

detecting, using an acceleration input sensor connected to the processor, an acceleration input value;

determining, using the processor, a power request value based on the acceleration input value; and adjusting, using the processor, the operation of the engine based on the power request value.

5. The method of claim 4 further comprising detecting, using a vehicle speed sensor connected to the processor, a vehicle speed value,
wherein the step of adjusting, using the processor, the operation of the engine is further based on the vehicle speed value.

6. The method of claim 4 wherein the step of adjusting, using the processor, the operation of the engine is performed prior to the vehicle travelling on the known route segment or the known route.

7. The method of claim 4 wherein the step of adjusting, using the processor, the operation of the engine is performed during the vehicle travelling on the known route segment or the known route.

8. A method of optimizing energy efficiency of a vehicle, the method comprising:
storing, in a memory, a plurality of route segments and corresponding energy efficiency data, the energy efficiency data including an energy efficiency value corresponding to energy consumed by the vehicle when a route segment was previously travelled;
storing, in the memory, at least one of an engine start threshold for starting an operation of an engine or an engine stop threshold for stopping the operation of the engine;
identifying, using a processor connected to the memory, at least one route segment of the plurality of route segments;
determining, using the processor, that the corresponding energy efficiency value of the identified at least one route segment is below an energy efficiency threshold;
adjusting, using the processor, at least one of the engine start threshold or the engine stop threshold based on the corresponding energy efficiency data of the identified at least one route segment for optimizing the energy efficiency of the vehicle; and
controlling, using the processor, a power output of the engine based on the adjusted at least one of the engine start threshold or the engine stop threshold.

9. The method of claim 8 further comprising:
storing, in the memory, a vehicle speed threshold value for starting or stopping the operation of the engine;
detecting, using a vehicle speed sensor connected to the processor, a vehicle speed value; and
adjusting, using the processor, the vehicle speed threshold value based on the corresponding energy efficiency data of the identified at least one route segment for optimizing the energy efficiency of the vehicle.

10. The method of claim 9 further comprising:
detecting, using an acceleration input sensor connected to the processor, an acceleration input value;
detecting, using a vehicle speed sensor connected to the processor, a vehicle speed value; and
determining, using the processor, a power request value based on the acceleration input value and the vehicle speed value,
wherein the step of adjusting, using the processor, at least one of the engine start threshold or the engine stop threshold is further based on the power request value.

11. A system for optimizing energy efficiency of a vehicle for known route segments or routes, the system comprising:
a memory for storing vehicle operation data for a known route segment or a known route previously travelled by the vehicle, the vehicle operation data including an energy efficiency value corresponding to energy consumed by the vehicle when the known route segment or the known route was previously travelled, and an engine start threshold for starting an operation of an engine or an engine stop threshold for stopping the operation of the engine;
a processor connected to the memory and to the engine of the vehicle, the processor configured to:
determine that the energy efficiency value corresponding to energy consumed by the vehicle when the vehicle travelled over the known route segment or the known route is below an energy efficiency threshold,
determine or predict that the vehicle will travel over the known route segment or the known route,
adjust the operation of the engine to optimize the energy efficiency of the vehicle by adjusting at least one of the engine start threshold or the engine stop threshold based on the energy efficiency value when the vehicle travels over the known route segment or the known route, and
control a power output by the engine based on the adjusted at least one of the engine start threshold or the engine stop threshold.

12. The system of claim 11 wherein
the energy consumed by the vehicle includes power output of the engine and power output using a battery of the vehicle when the vehicle travelled on the known route segment or the known route.

13. The system of claim 11 further comprising an acceleration input sensor connected to the processor and configured to detect an acceleration input value, wherein
the processor is further configured to determine a power request value based on the acceleration input value, and adjust the operation of the engine further based on the power request value.

14. The system of claim 13 further comprising a vehicle speed sensor connected to the processor and configured to detect a vehicle speed value, wherein the processor is further configured to adjust the operation of the engine further based on the vehicle speed value.

15. The system of claim 11 wherein the processor is further configured to adjust at least one of the engine start threshold or the engine stop threshold based on a time period during the travelling of the vehicle on the known route segment or the known route that the engine was in an on state.

* * * * *